No. 640,040. Patented Dec. 26, 1899.
P. SOHÈGE.
EXPANSIBLE PULLEY.
(Application filed Mar. 26, 1898.)
(No Model.) 2 Sheets—Sheet 1.
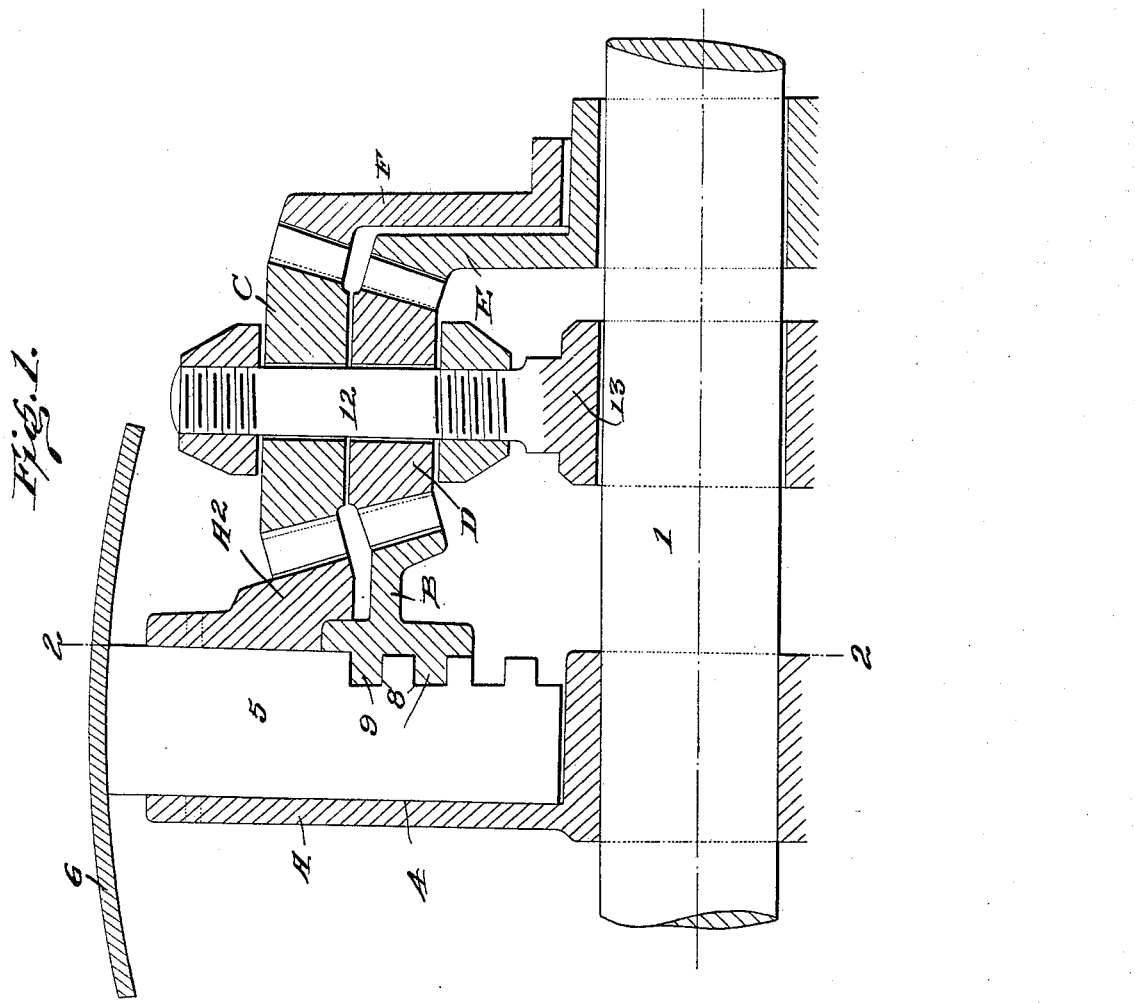

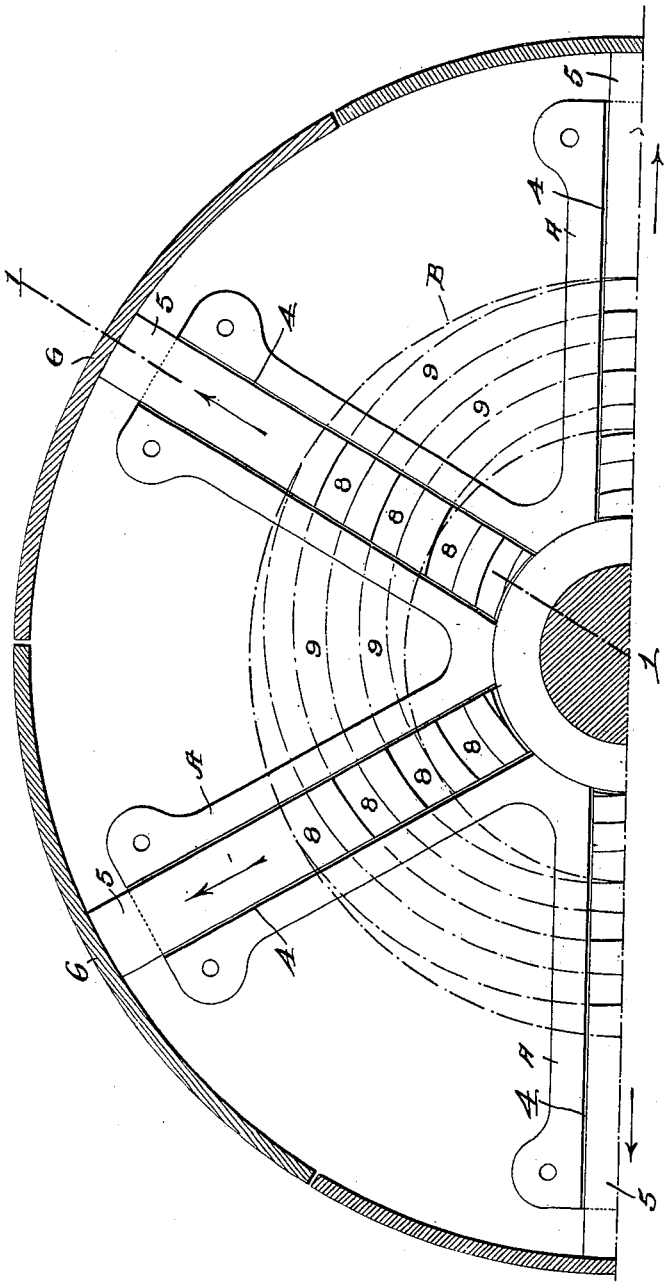

UNITED STATES PATENT OFFICE.

PAUL SOHÈGE, OF PARIS, FRANCE.

EXPANSIBLE PULLEY.

SPECIFICATION forming part of Letters Patent No. 640,040, dated December 26, 1899.

Application filed March 26, 1898. Serial No. 675,285. (No model.)

*To all whom it may concern:*

Be it known that I, PAUL SOHÈGE, a citizen of France, residing at Paris, France, have invented certain new and useful Improvements in Connection with Expansible Pulleys and other Expansible Rotary Bodies, of which the following is a specification.

This invention relates to expansible pulleys, and has for its object to provide an improved construction and arrangement of parts by means of which the pulley may be expanded and contracted without stopping or retarding its rotation.

To this end my invention consists in the features and in the construction, combination, and arrangement of parts hereinafter described, and particularly pointed out in the claims following the description, reference being had to the accompanying drawings, forming a part of this specification, wherein—

Figure 1 is a vertical sectional view of an expansible pulley constructed in accordance with my invention, the section being taken on the line 1 1 of Fig. 2; and Fig. 2 is a transverse sectional view taken on the line 2 2 of Fig. 1.

The rim or periphery of the pulley is made in a plurality of segments 6, each having a stem 5, fitted to slide radially in a recess 4 in an arm A, projecting radially from the boss of the pulley. The arms A carry a gear-wheel $A^2$, which gears with a beveled pinion C, mounted loosely on a stud 12, provided with a collar 13, loosely journaled on the shaft 1, on which shaft the boss of the pulley is fixed. On the stud 12 is also loosely mounted a beveled pinion D, which gears with a gear-wheel B, provided with a spiral rib 9, engaging a spiral groove 8, formed in the stems 5 of the pulley. Loosely mounted on the shaft 1 are beveled gear-wheels F and E, gearing, respectively, with the pinions C and D, means (not shown) being provided for preventing or permitting at will the rotation of said wheels E and F, as required.

The pinion C, as before stated, is loosely mounted upon the stud 12 and gears with the gear-wheels $A^2$ and F, while the pinion D, which is also loosely mounted upon the stud 12, gears with the gear-wheels B and E.

The gear-wheel B is fitted to turn in its bed or bearing provided on the arms A of the pulley. The stud 12 rotates around the shaft 1 with the pinions C D. If the wheel $A^2$ is rotated while the wheels E and F are motionless, the stud 12 is caused by the pinion C to rotate therewith around the shaft 1 at a speed equal to one-half the ratio of speed at which the wheel $A^2$ rotates, because the pinion C gears, on the one hand, with the wheel $A^2$, to which a rotary movement is imparted, and, on the other hand, with the wheel F, which is motionless, and by the rotation of the stud 12 the pinion D is rotated about said stud as an axis, owing to the pinion gearing with the motionless wheel E, causing the wheel B to turn at the same ratio of speed as the wheel $A^2$.

It will be evident from the foregoing that by imparting rotary movement to the wheel E or allowing said wheel to rotate while the wheel $A^2$ and stud 12 are rotating the wheel B will be caused, through the medium of the pinion D, to turn in its bearing in the wheel $A^2$ in the inverse direction to the wheel E and by the engagement of the spiral rib 9 with the groove 8 increase or reduce the diameter of the pulley, according to the direction in which the wheel E is turned. The same effect will be produced if the wheel E is prevented from rotating and the wheel F be rotated, as by rotation of the wheel F the pinion C will be rotated on the stud 12 and will no longer prevent the ratio of one-half speed relatively to the wheel $A^2$, and will, through the medium of the pinion D, transmit the difference of the ratio of speed to the wheel B, so that the same result is obtained. Thus, according to the direction of rotation of the wheel B, the stems 5, with the segments 6 of the rim of the pulley, will be caused to either recede from or approach the shaft 1 through the medium of the spiral rib 9 on the wheel B and the grooves 8 in the stems 5, whereby the pulley is expanded or contracted.

Instead of bevel-gearing, as shown in the drawings, spur-wheels or other suitable gearing may be employed to effect the result hereinbefore described.

Having described my invention, what I claim is—

1. The combination of a shaft, a stud extending radially therefrom, two pinions loosely mounted on the stud, gear-wheels loosely mounted on the shaft and meshing with the pinions slidable stems having a spiral groove, a gear-wheel meshing with one of the pinions on said stud, and a gear-wheel meshing with the other pinion on the stud and provided with a rib in engagement with the spiral grooves of the slidable stems carrying the segments of the pulley-rim, substantially as described.

2. The combination of the spirally-grooved stems carrying the rim-segments at their outer ends, the gear-wheel provided with ribs engaging said grooves, a shaft, a stud projecting at a right angle from said shaft, pinions loosely mounted on the stud, a gear-wheel meshing with one of said pinions and provided with guides for the said stems, and gear-wheels loose upon the shaft and meshing with the pinions on said stud, substantially as described.

3. The combination of a shaft, a stud extending radially therefrom, two pinions loosely mounted on the stud and normally in a state of rest, gear-wheels loosely mounted on the shaft and meshing with the pinions, slidable stems having a spiral groove, a gear-wheel meshing with one of the pinions on said stud, and a gear-wheel meshing with the other pinion on the stud and provided with a rib in engagement with the spiral grooves of the slidable stems carrying the segments of the pulley-rim, substantially as described.

In testimony whereof I have hereunto set my hand in presence of two subscribing witnesses.

PAUL SOHÈGE.

Witnesses:
 ALFRED FREY,
 EDWARD P. MACLEAN.